United States Patent

Oga

(10) Patent No.: US 9,031,154 B2
(45) Date of Patent: May 12, 2015

(54) OFDM MODULATOR, OFDM TRANSMISSION DEVICE, AND OFDM MODULATION METHOD

(75) Inventor: Toshiyuki Oga, Tokyo (JP)

(73) Assignee: Lenovo Innovations Limited (Hong Kong), Quarry Bay (HK)

(*) Notice: Subject to any disclaimer, the term of this patent is extended or adjusted under 35 U.S.C. 154(b) by 2 days.

(21) Appl. No.: 13/640,148

(22) PCT Filed: Mar. 30, 2011

(86) PCT No.: PCT/JP2011/001927
§ 371 (c)(1),
(2), (4) Date: Oct. 9, 2012

(87) PCT Pub. No.: WO2011/129064
PCT Pub. Date: Oct. 20, 2011

(65) Prior Publication Data
US 2013/0028347 A1 Jan. 31, 2013

(30) Foreign Application Priority Data
Apr. 13, 2010 (JP) ................... 2010-092318

(51) Int. Cl.
*H04L 27/00* (2006.01)
*H04L 27/26* (2006.01)
*H04L 5/00* (2006.01)

(52) U.S. Cl.
CPC .......... *H04L 27/2628* (2013.01); *H04L 5/0007* (2013.01); *H04L 27/0002* (2013.01); *H04L 27/2636* (2013.01); *H04L 5/0012* (2013.01)

(58) Field of Classification Search
None
See application file for complete search history.

(56) References Cited

U.S. PATENT DOCUMENTS

| | | | |
|---|---|---|---|
| 6,726,297 | B1 | 4/2004 | Uesugi |
| 2009/0207931 | A1 | 8/2009 | Ohwatari et al. |

FOREIGN PATENT DOCUMENTS

| | | |
|---|---|---|
| EP | 1 001 566 A1 | 5/2000 |
| JP | 11-346203 A | 12/1999 |
| JP | 2000-307543 A | 11/2000 |
| JP | 2008-5324 A | 1/2008 |
| JP | 2008-078790 A | 4/2008 |
| JP | 2008078790 A | 4/2008 |
| JP | 2009-194732 A | 8/2009 |
| JP | 2009-239539 A | 10/2009 |
| JP | 2011-029720 A | 2/2011 |

OTHER PUBLICATIONS

Communication dated Sep. 9, 2014 from the Japanese Patent Office in counterpart application No. 2012-510547.
State Intellectual Property Office of People'S Republic of China, Serial No. 201180018215.0, issuing date: Oct. 8, 2014, all pages.

*Primary Examiner* — Adolf Dsouza

(57) ABSTRACT

A transmission device 100 has an inverse fast Fourier transform converter 104 (first circuit) that acquires plural multi-value symbol data each of which is assigned to a dedicated subcarrier, and generates waveform data on the basis of the acquired plural multi-value symbol data, and a digital frequency converter 107 (second circuit) that shifts frequency of the waveform data generated by the inverse fast Fourier transform converter 104.

15 Claims, 6 Drawing Sheets

OFDM MODULATOR, OFDM TRANSMISSION DEVICE, AND OFDM MODULATION METHOD

CROSS REFERENCE TO RELATED APPLICATIONS

This application is a National Stage of International Application No. PCT/JP2011/001927 filed on Mar. 30, 2011, which claims priority from Japanese Patent Application No. 2010-092318, filed on Apr. 13, 2010, the contents of all of which are incorporated herein by reference in their entirety.

TECHNICAL FIELD

The present invention relates, for example, to an OFDM modulator, an OFDM transmission device including the OFDM modulator, and an OFDM modulation method.

BACKGROUND ART

In recent years, various fields of wireless communications have been employing an orthogonal frequency division multiplex (OFDM) system. The OFDM system is a multi-carrier system using plural narrow-band subcarriers orthogonal to each other. This system transmits a signal including subcarriers respectively modulated and having square-like frequency spectrum whose shape is a substantially square form as a whole, and thus obtains high frequency-usage efficiency. Further, the OFDM system can have a longer symbol length than a single carrier system, and thus, has a resistance to the delayed waves. By addition of guard intervals, this system obtains enhanced resistance to the multipath environment.

An orthogonal frequency division multiple access (OFDMA) system is a multiple access system in which, based on the OFDM system, each of subcarriers is assigned for a dedicated destination of information to be transmitted, thereby simultaneously transmits the information to plural destinations. In the OFDMA system, it is possible to set, for example, the number of subcarriers assigned, and the radio modulation system and transmission power for a subcarrier, in accordance with destinations of information transmitted. Under some condition, there may be a case that a specific subcarrier does not exist.

An integrated services digital broadcasting-terrestrial system (ISDB-T system), which is a Japanese standard broadcasting system for digital television, employs a band segmented transmission OFDM system (BST-OFDM system). In the BST-OFDM system, the subcarriers in the OFDM system are separated into groups called segments, and the segments are assigned on the usage basis, whereby it is possible to achieve settings (for example, radio modulation system, transmission power) appropriate for each usage.

Further, in the Long Term Evolution (LTE) system developed by the Third Generation Partnership Project (3GPP), the OFDMA system is employed for the downlink from a base station to a mobile station. And a single carrier-frequency division multiple access (SC-FDMA) system, based on a discrete Fourier transform spread (DFT-Spread) OFDM, is employed for the uplink from the mobile station to the base station.

In the SC-FDMA system, the number of subcarriers to be used varies depending on frequencies (symbol rate) of the multi-value symbol data. Thus, one transmitter can use all the subcarriers set for each frequency band allocated as a transmission band. However, the one transmitter does not always use all the subcarriers at the same time. The other transmitter can use the subcarriers that are not in use, and hence, plural transmitters can share the same transmission band at the same time, effectively utilizing the frequency resources.

Further, the multi-carrier system such as the OFDM system has a high peak to average power ratio (PAPR) in the radio signals as compared with the single carrier system, requiring radio signal circuits having much lower distortion characteristics. The SC-FDMA system applies discrete Fourier transform to sequence of multi-value symbol data corresponding to original time waveform to generate modulation information of the subcarrier (frequency spectrum information). Further, the SC-FDMA system keeps the relative frequency arrangement of the subcarriers unchanged before and after subcarrier mapping, thereby bringing the time waveform of the radio signal close to the waveform of the single carrier system. This makes it possible to reduce the PAPR thereof to a level close to the single carrier system, relaxing the low distortion performance required for the radio signal circuit.

Further, the SC-FDMA system has a characteristic in which the frequency of subcarrier to be used can be easily changed by switching the mapping of the subcarrier. With this characteristic, the LTE system enables a frequency hopping function.

Patent Document 1 describes a technique related to a transmission device employing the SC-FDMA system. The transmission device of the SC-FDMA system is characterized in that frequency response of the SC-FDMA symbol is adjusted according to the frequency selection characteristics in a propagation path between the transmission device and a reception device.

RELATED ART DOCUMENT

Patent Document

Patent Document 1: Japanese Patent Application Laid-open No. 2009-239539

SUMMARY OF THE INVENTION

As typified by the mobile station of the LTE system, downsizing for the transmission device employing the OFDM system has been increasingly demanded. The present invention has been made in view of the circumstances described above, and an object of the present invention is to reduce sizes of circuits in an OFDM modulator or an OFDM transmission device including the OFDM modulator. Further, another object of the present invention is to provide an OFDM modulation technique capable of reducing an operation cost.

According to the present invention, there is provided an OFDM modulator comprising: a first circuit that acquires plural complex data each of which is assigned to a dedicated subcarrier, and generates waveform data on the basis of the acquired plural complex data; and a second circuit that acquires the waveform data generated by the first circuit, and shifts frequency of the waveform data.

Further, according to the present invention, there is provided an OFDM transmission device including a modulator comprising: a first circuit that acquires plural complex data each of which is assigned to a dedicated subcarrier, and generates waveform data on the basis of the acquired plural complex data; and a second circuit that acquires the waveform data generated by the first circuit, and shifts frequency of the waveform data.

Yet further, according to the present invention, there is provided an OFDM modulation method including: acquiring plural complex data each of which is assigned to a dedicated subcarrier; generating waveform data on the basis of the acquired plural complex data; acquiring the generated waveform data; and shifting frequency of the waveform data.

Yet further, according to the present invention, there is provided a computer readable storage medium that stores a program for causing a computer to perform: a first process of acquiring plural complex data each of which is assigned to a dedicated subcarrier, and generating waveform data on the basis of the acquired plural complex data; and a second process of acquiring the waveform data generated in the first process, and shifting frequency of the waveform data, and also there is provided the above-described program.

According to the present invention, it is possible to reduce the size of circuits in the OFDM modulator and the OFDM transmission device including the OFDM modulator. Further, according to the present invention, it is possible to provide an OFDM modulation technique capable of reducing an operation cost.

BRIEF DESCRIPTION OF THE DRAWINGS

The above-described object and other objects of the present invention, and features and advantages of the present invention will be made further clear by the preferred exemplary embodiment described below and the following drawings attached thereto.

DESCRIPTION OF EMBODIMENTS

Figure 1:
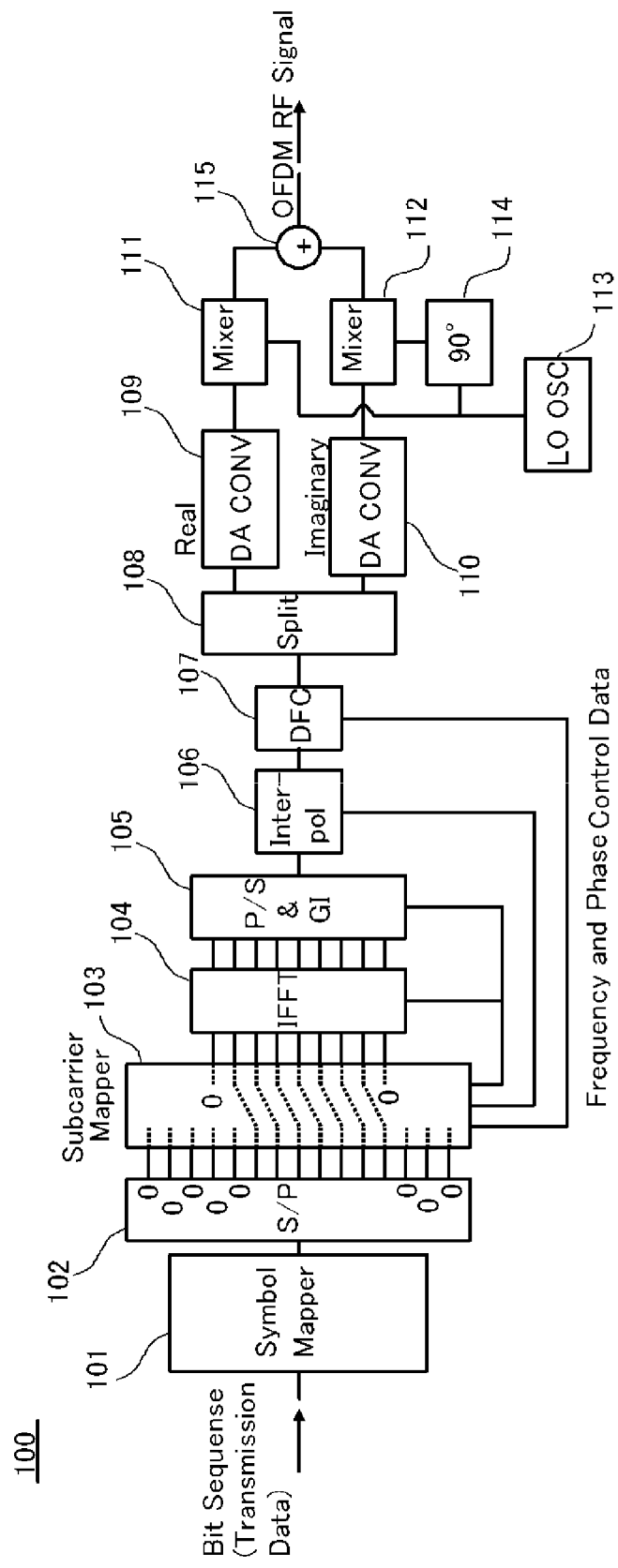
FIG. 1 is a configuration view illustrating a transmission device employing an OFDM modulator according to a first exemplary embodiment.

Hereinbelow, exemplary embodiments of the present invention will be described with reference to the drawings. Note that, in all the drawings, the same constituent components are denoted by the same reference numerals, and detailed explanation thereof will not be repeated.

[First Exemplary Embodiment]

Figure 4:
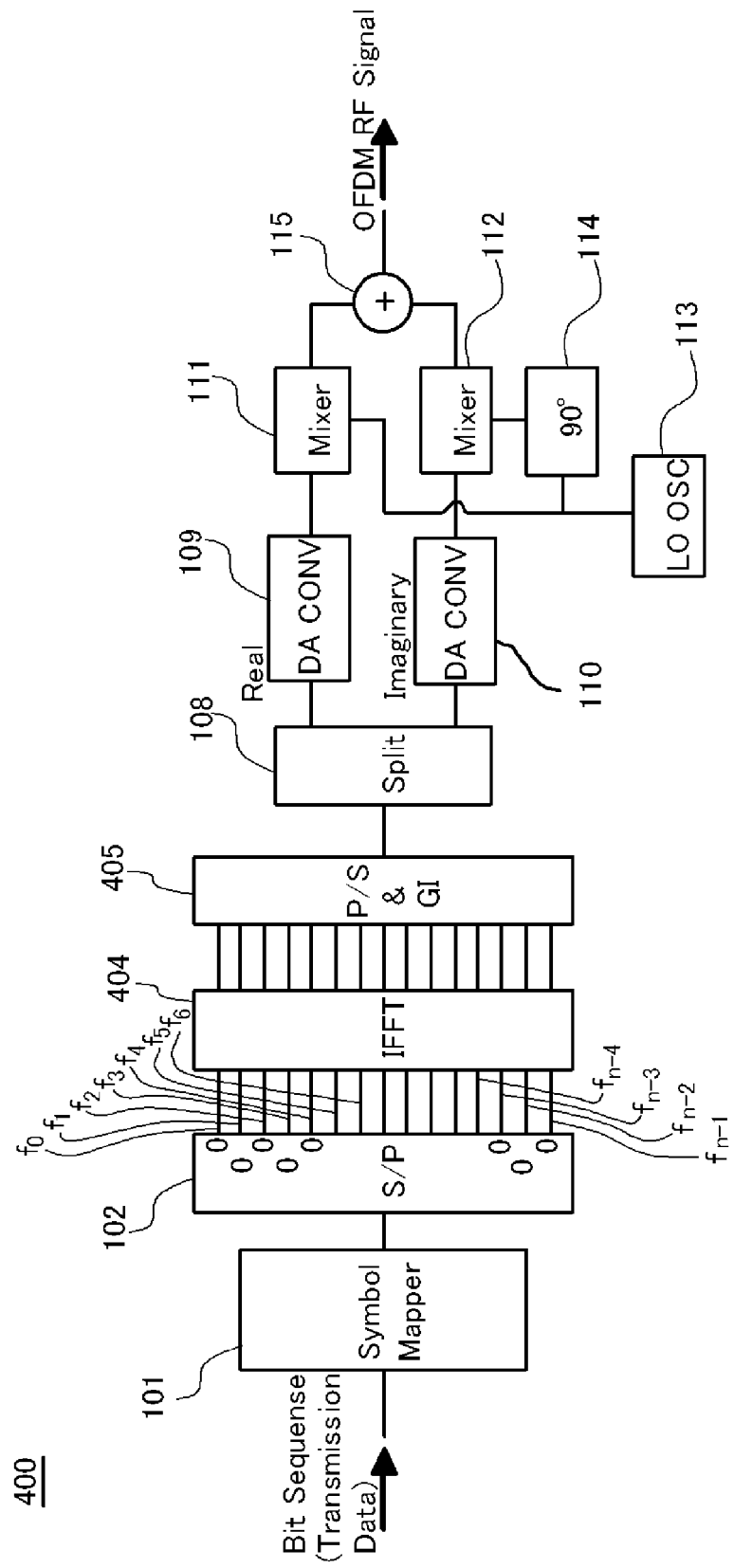
FIG. 4 is a configuration view illustrating a transmission device employing a general OFDM modulator.

FIG. 4 is a diagram illustrating a configuration of a transmission device 400 employing a general OFDM modulator.

A bit sequence, which is transmission data inputted, is converted into multi-value symbol data of sequence such as 16QAM and 64QAM, and the multi-value symbol data of sequence are assigned to subcarriers of an OFDM by a symbol mapping circuit 101. In this specification, the expression "converted into multi-value symbol data" means that the inputted bit sequence is converted into plural complex data, and a dedicated subcarrier is assigned to each of the complex data. Further, the complex data is a complex number including bit information constituting the bit sequence. The multi-value symbol data contains each complex data, frequency information of the subcarrier which is assigned to the complex data and modulated by the complex data, and time (timing) information at which the complex data is to be outputted. And the multi-value symbol data corresponds to a spectrum of the OFDM signal to be outputted.

A serial-parallel (S/P) converting circuit 102 converts the multi-value symbol data into parallel multi-value symbol data, which is parallel data. The converted parallel multi-value symbol data is inputted into an inverse fast Fourier transform converter (IFFT) 404. The inverse fast Fourier transform converter (IFFT) 404 applies inverse fast Fourier calculation to the inputted data to convert it into parallel time waveform data, which is parallel data. This inverse fast Fourier calculation serves as the OFDM modulation. In this specification, the inverse fast Fourier transform represents an inverse transform of a fast Fourier transform. The fast Fourier transform is an algorithm to rapidly compute discrete Fourier transform in a calculator, and is also used, for example, for frequency analysis of discrete digital signal, for example, in signal processing. Through the inverse fast Fourier transform, spectrum information on discrete frequency points is converted into the discrete time waveform information.

A parallel-serial (P/S) converting and guard-interval (GI) adding circuit 405 adds waveform of guard interval duration to the parallel time waveform data outputted from the IFFT 404 to convert the parallel time waveform data into time sequence data in serial.

The processes described above are performed as complex number calculation. The output from the P/S converting and GI adding circuit 405 is inputted into a splitting circuit (splitter) 108 to extract real-part component coefficient data and imaginary-part component coefficient data. In this specification, the real-part component coefficient data is referred to as an in-phase digital base band signal (I-DBB signal), and the imaginary-part component coefficient data is referred to as a quadrature digital base band signal (Q-DBB signal).

The I-DBB signal and the Q-DBB signal are converted by digital-analog (D/A) converters 109 and 110 into an in-phase analog base band signal (I-ABB signal) and a quadrature analog base band signal (Q-ABB signal), respectively, each of which is an analog waveform signal. Then, the converted signals are each mixed with a LO signal, which is a carrier wave, by frequency converters (mixers) 111 and 112, respectively, and are converted into an in-phase carrier band signal (I-RF signal) and a quadrature carrier band signal (Q-RF signal), respectively.

An output from a local oscillator (LO OSC) 113 is inputted into the frequency converters 111 and 112 as a LO signal in a manner such that phase of the LO signal inputted into the frequency converter 112 is delayed by 90° from the LO signal inputted into the frequency converter 111 by a 90° phase shifter 114.

A combiner 115 combines the I-RF signal and the Q-RF signal, and outputs the combined signal as a carrier band signal (RF signal).

An orthogonal frequency division multiple access (OFDMA) system is a multiple access system in which, based on the OFDM system, the subcarriers are assigned for each of different destination of information to be transmitted, thereby simultaneously transmitting the information to plural receivers. In the OFDMA system, it is possible to set the number of subcarriers assigned, and the radio modulation system and transmission power for each of the subcarriers in accordance with destinations of information transmitted. Under some condition, there may be a case that a specific subcarrier does not exist. For example, FIG. 4 schematically illustrates a case where there exists no subcarrier for subcarrier frequencies from $f_0$ to $f_4$ and from $f_{n-3}$ to $f_{n-1}$, in other words, a case where spectrum on each of the subcarriers is zero, where $f_0 < f_1 < f_2 < f_3 < f_4 < f_5 < \ldots < f_{n-4} < f_{n-3} < f_{n-2} < f_{n-1}$.

Next, with reference to FIG. 1, a detailed description will be made of a transmission device 100 employing an OFDM modulator according to the first exemplary embodiment of the present invention. Differences from the transmission device 400 illustrated in FIG. 4 will be described.

In FIG. 1, the symbol mapping circuit 101 acquires a bit sequence, which is transmission data, and outputs multi-value symbol data, which is a sequence of complex numbers.

The serial-parallel (S/P) converting circuit 102 acquires the multi-value symbol data, and outputs parallel multi-value symbol data, which is parallel data of the complex numbers.

The subcarrier mapping circuit 103 acquires the parallel multi-value symbol data, and outputs it to the inverse fast Fourier transform converter (IFFT) 104. The subcarrier mapping circuit 103 further outputs a frequency and phase control signal, an interpolation control signal and a frequency point number changing signal.

The inverse fast Fourier transform converter (IFFT) 104 acquires the parallel multi-value symbol data and the frequency point number changing signal from the subcarrier mapping circuit 103. The inverse fast Fourier transform converter (IFFT) 104 applies inverse fast Fourier transform to complex data of multi-value symbol data, which is identified by the frequency point number changing signal of all the multi-value symbol data contained in the parallel multi-value symbol data, and outputs parallel time waveform data, which is complex number.

A parallel-serial (P/S) converting and guard interval (GI) adding circuit 105 acquires the parallel time waveform data and the frequency point number changing signal, and outputs time waveform data of complex number sequence, which has waveform of guard interval duration added thereto.

An interpolating circuit 106 acquires the time waveform data of complex number sequence, and the interpolation control signal, and outputs interpolated time waveform data, which is complex number sequence.

A digital frequency converter (DFC) 107 acquires the interpolated time waveform data, and the frequency and phase control signal from the subcarrier mapping circuit 103, and outputs a complex digital base band signal (complex DBB signal), which is complex number.

In this exemplary embodiment, the OFDM modulator include the symbol mapping circuit 101, the serial-parallel (S/P) converting circuit 102, the subcarrier mapping circuit 103, the inverse fast Fourier transform converter (IFFT) 104, the parallel-serial (P/S) converting and guard interval (GI) adding circuit 105, the interpolating circuit 106, and the digital frequency converter (DFC) 107. In other words, a series of processes, from the input of the transmission data of sequence to the generation of the complex DBB signal, is referred to as processes concerning the OFDM modulation.

The splitting circuit (splitter) 108 acquires the complex DBB signal, and outputs an in-phase digital base band signal (I-DBB signal), and a quadrature digital base band signal (Q-DBB signal).

The digital-analog converter (D/A) 109 and the digital-analog converter (D/A) 110 acquire the I-DBB signal and the Q-DBB signal, respectively, and outputs an in-phase analog baseband signal (I-ABB signal), and a quadrature analog baseband signal (Q-ABB signal), respectively.

The local oscillator (LO OSC) 113 generates and outputs a local oscillation signal (LO signal).

The 90° phase shifter 114 acquires the LO signal, and outputs a quadrature LO signal.

The frequency converter (mixer) 111 acquires the I-ABB signal and the LO signal, and outputs an in-phase carrier band signal (I-RF signal).

The frequency converter (mixer) 112 acquires the Q-ABB signal and the quadrature LO signal, and outputs a quadrature carrier band signal (Q-RF signal).

The combiner 115 acquires the I-RF signal and the Q-RF signal, and outputs a carrier band signal (RF signal).

Figure 2:
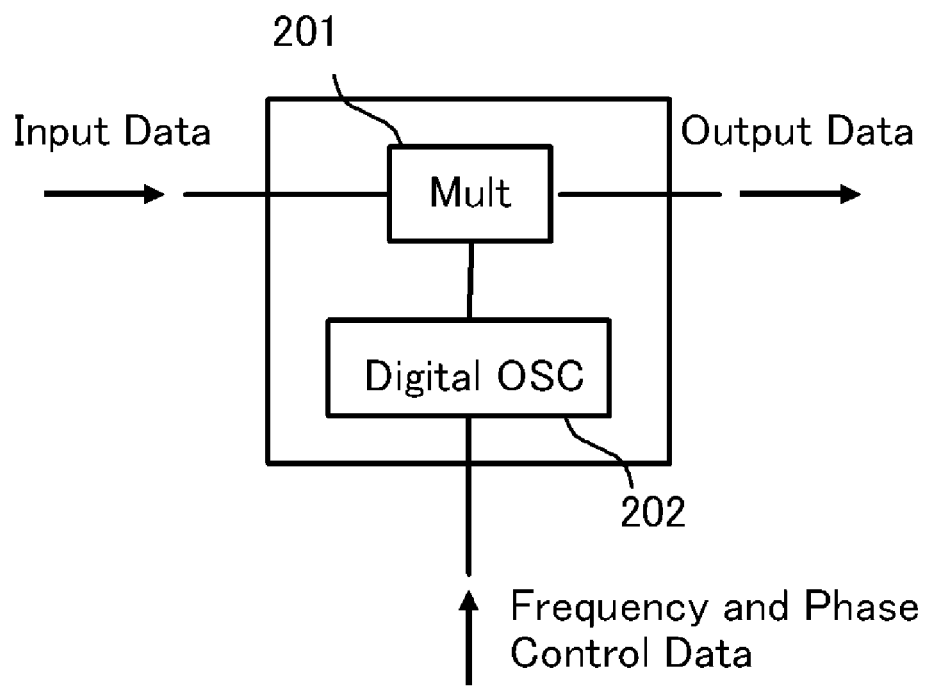
FIG. 2 is a configuration view illustrating a digital frequency converter according to this exemplary embodiment.

Next, a configuration of the digital frequency converter (DFC) 107 will be described in detail. FIG. 2 illustrates details of the digital frequency converter (DFC) 107 illustrated in FIG. 1.

The interpolated time waveform data inputted into the DFC 107 is inputted into a complex multiplier (Mult) 201.

A digital frequency synthesizer (Digital OSC) 202 acquires the frequency and phase control signal, and outputs a digital LO signal, which is a digital waveform value of sine curve having frequency and phase.

The complex multiplier (Mult) 201 acquires the interpolated time waveform data and the digital LO signal, and outputs the complex DBB signal.

[Explanation of Operations]

Next, operations of the transmission device 100 illustrated in FIG. 1 will be described.

The bit sequence, which is the transmission data, is inputted into the symbol mapping circuit 101, and is converted into the multi-value symbol data, which is a sequence of complex numbers. Each of the multi-value symbol data is a symbol such as 16QAM or 64QAM, and is a complex number containing information of plural bits. Further, with the symbol, frequency information of the subcarrier to be modulated based on the symbol, and time (timing) information for output of the subcarrier modulated based on the symbol, are linked, for example, in a sequential order form.

The multi-value symbol data, which is sequence, is inputted into the serial-parallel (S/P) converting circuit 102, is subjected to a parallel conversion, and is outputted as the parallel multi-value symbol data.

The parallel multi-value symbol data is inputted into the subcarrier mapping circuit 103, changed the subcarrier frequency assignment on the basis of the multi-value symbol data contained in the parallel multi-value symbol data and information on frequency of the to-be-modulated subcarrier linked to the respective multi-value symbol data, and outputted to the IFFT 104.

Further, the subcarrier mapping circuit 103 generates the frequency point number changing signal, and outputs the generated signal to the IFFT 104 and the P/S converting and GI adding circuit 105. The subcarrier mapping circuit 103 generates the interpolation control signal, and outputs the generated signal to the interpolating circuit 106. The subcarrier mapping circuit 103 generates the frequency and phase control signal, and outputs the generated signal to the digital frequency converter 107.

In general, with the inverse fast Fourier transform applied in the OFDM modulator, the subcarriers are arranged in a form such that the positive side and the negative side of frequency are symmetric with the center being frequency=0.

The amount of calculation for the inverse fast Fourier transform is in proportion to $N \cdot \log N$, where N is the number of frequency points. In the case of N=2048, $N \cdot \log N$=15615.219 . . . can be obtained. However, in the case of N=1024, $N \cdot \log N$=7097.827 . . . can be obtained, Reducing the frequency points, thus, leads to largely reducing the amount of calculation.

In addition to reduction in the amount of calculation, the waiting time for 2048 points, which is required for the data input to the serial-parallel conversion, is reduced to the waiting time for 1024 points. This waiting time reduction can make the calculations thereafter start earlier, and results in reduction in latency. With the reduction in the amount of calculation, it is possible to shorten the period of time when calculation resources are occupied, which also reduces the amount of resources necessary for the calculations. Note that, if the number N of frequency points is low, the amount of calculation can be reduced by, in lieu of the inverse fast Fourier transform, performing numerical calculation other than the inverse fast Fourier transform, or reading a waveform table to generate a sine waveform of the subcarrier.

On the other hand, with the OFDMA system and the SC-FDMA system, subcarriers to be generated may exist only in local portions on the frequency axes (localization). The localization can be detected on the basis of the distributions of the multi-value symbol data having the value of 0 and the multi-value symbol data having value other than 0 in the parallel multi-value symbol data.

It should be noted that, in this specification, the expression "having the value of 0" means that both the real part and the imaginary part of the complex data contained in the multi-value symbol data are zero, and the expression "having the value other than 0" means that at least one of the real part and the imaginary part of the complex data contained in the multi-value symbol data is not zero.

The subcarrier mapping circuit 103 detects whether the subcarrier localization occurs or not. On the basis of the detection results, the circuit 103 shifts the frequency of the subcarriers, and notifies the IFFT 104 using the frequency point number changing signal of the change of the frequency point number for the inverse fast Fourier transform.

More specifically, the subcarrier mapping circuit 103 specifies a certain frequency range (specific frequency band) formed by adjacent frequency points on the basis of the values of the complex data contained in the multi-value symbol data, and outputs, to the IFFT 104, the number of frequency points included in the specified frequency band as the frequency point number changing signal. Further, from all of the complex data contained in the multi-value symbol data, the subcarrier mapping circuit 103 selects the complex data to which the subcarrier contained in the specified frequency band is assigned, and shifts the frequency corresponding to the selected complex data. Then, the IFFT 104 applies inverse fast Fourier transform to the selected complex data of which frequency has been shifted.

For example, in a system that applies inverse fast Fourier transform by setting the maximum frequency point number Nmax=2048, if subcarriers that are actually required to be generated (which correspond to multi-value symbol data having values other than zero) are allocated within the adjacent 1024 frequency points, their frequency are shifted so as to make zero the central frequency of the distribution of the multi-value symbol data having a value other than zero. Then, the frequency point number changing signal and the parallel multi-value symbol data of which frequency has been shifted, are sent to the IFFT 104 so as to set the frequency point number N=1024 to apply inverse fast Fourier transform.

However, two problems arise in this case. The first problem is that frequency and phase of the subcarrier outputted from the IFFT 104 is shifted from the original value. The second problem is that, in the IFFT 104, the reduction in the number of frequency points inputted leads to the reduction in the number of sampling points for the output waveform, in other words, the sampling points for the output waveform are thinned out.

To solve the problems described above, the digital frequency converter 107 is provided for the problem concerning the shift of frequency or phase, and compensates the frequency and the phase on the basis of the frequency and phase control signal from the subcarrier mapping circuit 103. Noted that the frequency and phase control signal contains information on the frequency shifted by the subcarrier mapping circuit 103 and the phase changed as a result of the frequency shift.

For the problem of the number of sampling points for the waveform, on the basis of the interpolation control signal from the subcarrier mapping circuit 103, the interpolating circuit 106 interpolates the waveform sampling data. Note that the interpolation control signal contains information on the number of sampling points for the output waveform that are thinned out as a result of the frequency shift of the subcarrier and the reduction in the number of frequency points by the subcarrier mapping circuit 103. In this specification, the expression "information on the number of sampling points for the output waveform that is thinned out" refers, for example, to the number of frequency points (number of subcarriers) for the parallel multi-value symbol data outputted by the subcarrier mapping circuit 103

The parallel multi-value symbol data subjected to the frequency shift is inputted into the IFFT 104, is subjected to inverse fast Fourier transformation on the basis of the frequency point number changing signal, and is converted into the parallel time waveform data, which is a complex number. On the basis of the frequency point number changing signal, the IFFT 104 can switch activation and halt of the calculation circuit so as to match the number of frequency points. Further, the IFFT 104 can also select a calculation circuit suitable for the number of frequency points, and switch a circuit to the suitable calculation circuit. Yet further, the IFFT 104 changes parameters concerning settings of operations of a program for the calculation processes to operate in a manner suitable for the number of frequency points.

The P/S converting and GI adding circuit 105 adds guard interval to the parallel time waveform data, and coverts this data into pre-interpolation time waveform data, which is a sequence of complex numbers and serial data. The number of data of the parallel time waveform data varies according to the number of data inputted into the IFFT 104, in other words, the number of subcarriers. The P/S converting and GI adding circuit 105 needs to acquire the number of data of the parallel time waveform data to be inputted in advance, so as to operate on the basis of the acquired information. For this reason, the P/S converting and GI adding circuit 105 performs the above-described process on the basis of the frequency point number changing signal obtained from the subcarrier mapping circuit 103.

The interpolating circuit 106 receives the pre-interpolation time waveform data, interpolates the received pre-interpolation time waveform data in terms of the waveform data on the basis of the interpolation control signal obtained from the subcarrier mapping circuit 103, and outputs the interpolated time waveform data.

The digital frequency converter 107 receives the interpolated time waveform data, shifts the frequency of the received interpolated time waveform data toward the opposite direction to the frequency shift performed by the subcarrier mapping circuit 103 by the amount of frequency shifted by the subcarrier mapping circuit 103, and outputs the thus obtained data as the complex DBB signal.

The splitting circuit 108 receives the complex DBB signal. Operations thereafter are identical with those with the general OFDM transmission device illustrated in FIG. 4, and detailed description thereof will not be repeated.

With reference to FIG. 2, operations of the digital frequency converter 107 will be described.

The time waveform data inputted into the digital frequency converter 107 is inputted into the complex multiplier (Mult) 201. Further, the frequency and phase control signal inputted into the digital frequency converter 107 is inputted into the digital frequency synthesizer (Digital OSC) 202, and on the basis of the inputted signal, the digital frequency synthesizer (Digital OSC) 202 generates a digital LO signal, which is a digital waveform of complex number. The complex multiplier 201 multiplies the digital LO signal by the time waveform data to generate the complex DBB signal as a result of the multiplication.

A specific example of the digital frequency synthesizer (Digital OSC) 202 includes a digital sine waveform generation circuit of a direct digital synthesizer (DDS). In general, the DDS converts the digital sine waveform into an analog form, and outputs the analog signal.

Each unit of the transmission device 100 may be realized logically by a computer program, or be formed as unique hardware, or be realized by a combination of software and hardware.

In the case where each unit of the transmission device 100 is realized by a computer program, the computer program is stored in a computer readable storage medium, and a computer reads the computer program from the storage medium, and mainly performs the following processes.

(a) Convert inputted bit sequence into plural complex data, and assigned a dedicated subcarrier to each of the plural complex data.
(b) Detect a frequency band on the basis of a value of the complex data, and select complex data to which a subcarrier existing in the detected frequency band is assigned.
(c) Apply inverse fast Fourier transform (inverse discrete Fourier transform) to the complex data selected in the process of (b), and generate a waveform data.
(d) On the basis of the frequency band detected in the process of (b), interpolate the waveform data, and shift frequency.

Next, effects obtained by this exemplary embodiment will be described. According to this exemplary embodiment, the number of complex data (the number of frequency points) inputted into the inverse fast Fourier transform converter 104 is reduced, so that the amount of calculation for the inverse fast Fourier transform can be reduced. Thus, it is possible to reduce the power consumed by the inverse fast Fourier transform converter 104. Further, it is possible to reduce the latency for the calculation of inverse fast Fourier transform.

At the time of designing a circuit, by setting the number of frequency points inputted into the inverse fast Fourier transform converter 104 less than the number of subcarriers which the symbol mapping circuit 101 can assign, it is possible to reduce the circuit size of the subcarrier mapping circuit 103 and the inverse fast Fourier transform converter 104, which leads to a reduction in the sizes of circuits of the entire transmission device 100. This makes it possible to reduce the manufacturing cost of the transmission device 100.

Further, the time for waiting the input of the data in the serial-parallel converting circuit 102 can be reduced, so that the entire latency can be reduced. In addition to the calculation of inverse fast Fourier transform, the reduction in the latency leads to a reduction in the period of time when calculators are being occupied. This makes it possible to reduce the resources necessary for calculation, and use the resources for other calculation.

[Second Exemplary Embodiment]

Figure 5:
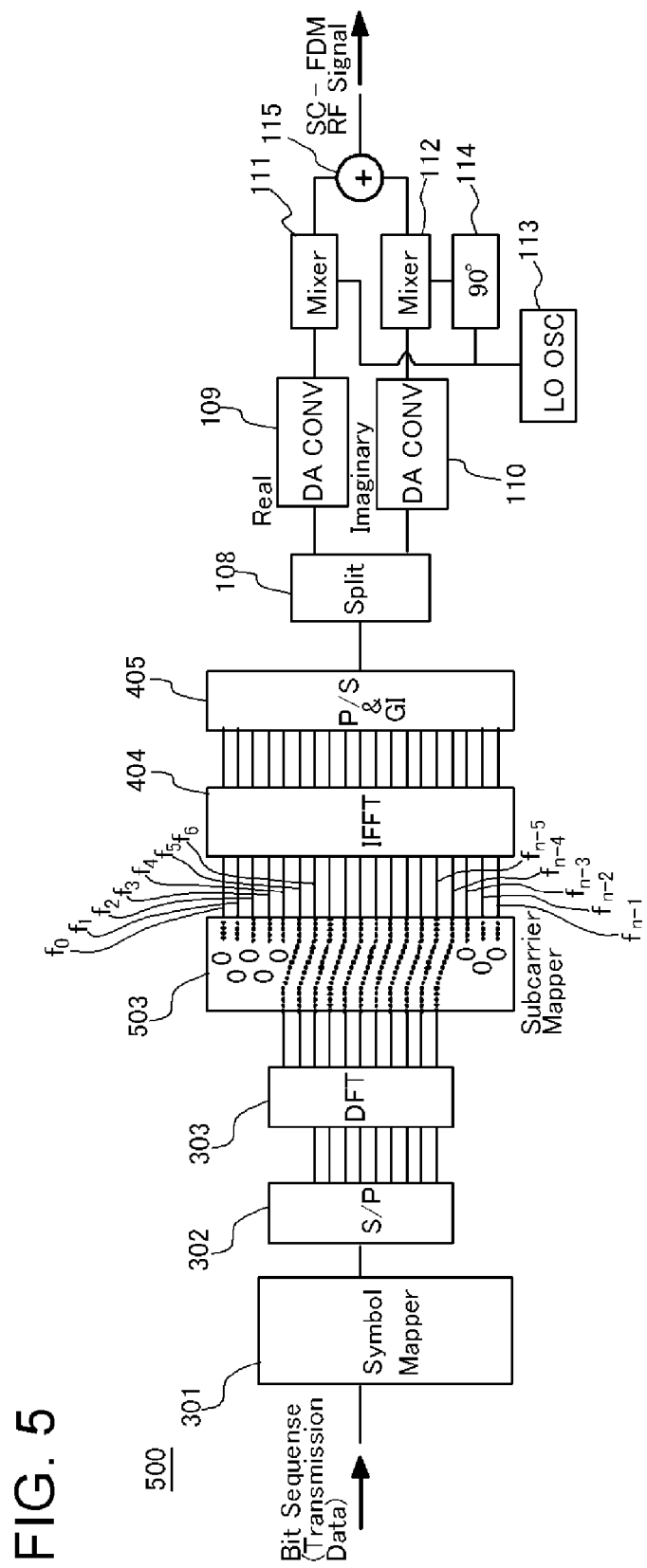
FIG. 5 is a configuration view illustrating a transmission device employing an SC-FDMA system based on a general DFT-Spread OFDM.

FIG. 5 illustrates a configuration of a transmission device 500 employing an SC-FDMA system based on a DFT-Spread OFDM used in the LTE system.

The SC-FDMA system based on the DFT-Spread OFDM (hereinafter, referred to as "SC-FDMA system") applies discrete Fourier transform (DFT) to a symbol sequence to be transmitted, and the thus obtained signal is inputted into the OFDM system. Next, differences from those illustrated in FIG. 4 will be described.

A symbol mapping circuit 301 converts a bit sequence, which is transmission data inputted, into multi-value symbol data of sequence such as 16QAM and 64QAM. A serial-parallel (S/P) converting circuit 302 converts the multi-value symbol data converted by the symbol mapping circuit 301 into parallel multi-value symbol data, and inputs the thus obtained data into a discrete Fourier transform converter (DFT) 303. The discrete Fourier transform converter (DFT) 303 converts the inputted data into discrete frequency spectrum data through fast Fourier transform. The number of sampling points of discrete Fourier transform is determined according to symbol rate, which is the number of multi-value symbol data inputted per unit time, and is set larger when the symbol rate of the multi-value symbol data is higher whereas set smaller when the symbol rate of the multi-value symbol data is lower. With this setting, the number of the frequency spectrum data outputted corresponds to the symbol rate of the multi-value symbol data inputted. The number of the frequency spectrum data becomes higher with the increase in the symbol rate of the multi-value symbol data, and becomes lower with the decrease in the symbol rate of the multi-value symbol data.

Each of frequency spectrum data corresponds to a complex data in the OFDM modulator. In the OFDM modulator in the first exemplary embodiment, the multi-value symbol data, the complex data, and the subcarrier are in a one-to-one correspondence with each other. In the SC-FDMA system, the DFT 303 applies fast Fourier transform (discrete Fourier transform) to extract frequency spectrum data, which is complex data, from plural multi-value symbol data. Each of the frequency spectrum data is in the one-to-one correspondence with the subcarrier, but not in the one-to-one correspondence with the multi-value symbol data. In this regard, the SC-FDMA system is different from the OFDM modulator. More specifically, with the symbol mapping circuit 101 in the first exemplary embodiment, a single subcarrier is assigned to a single multi-value symbol data. On the other hand, with the symbol mapping circuit 301 in this exemplary embodiment, plural subcarriers are assigned to plural multi-value symbol data, and the multi-value symbol data and the subcarriers are in an M-to-N correspondence with each other, which differentiates the SC-FDMA system from the OFDM modulator.

The frequency spectrum data is assigned by a subcarrier mapping circuit 503 to a predetermined subcarrier, and outputted as spectrum of the subcarrier. Information on assigning of the subcarrier is given from the higher-order layer of the system. As described above, in the SC-FDMA system, the multi-value symbol data and the frequency spectrum data derived from the multi-value symbol data are made correspond to information on the number of corresponding subcarriers (frequency bandwidth), but they are not made correspond directly to the frequency of the subcarrier. Note that the term "higher-order layer of the system" is a portion of the communication system including the transmission device 500, this portion being not illustrated in FIG. 5. The higher-order layer of the system may exist in the transmission device 500, or may exist externally to the transmission device 500.

As described above, with the SC-FDMA system, the number of subcarriers to be used varies depending on the symbol rate of the multi-value symbol data. Thus, although it is possible for one transmission device to use all the subcarriers which are specified in the frequency band assigned as a transmission band, the one transmission device does not always use all the subcarriers at the same time. Further, the other transmission device can use the subcarrier that is not in use, whereby plural transmission devices share the same transmission band at the same time, effectively utilizing the frequency resources. This is the first characteristic of the SC-FDMA system.

In general, the multi-carrier system such as the OFDM system has a peak to average power ratio (PAPR) of the radio signal higher than that of the single carrier system, and requires radio signal circuits exhibiting lower distortion characteristics. On the other hand, the SC-FDMA system applies discrete Fourier transform to the sequence of multi-value symbol data corresponding to the original time waveform to generate modulation information of the subcarrier (frequency spectrum information). Further, the SC-FDMA system keeps the relative frequency arrangement of the subcarriers unchanged before and after subcarrier mapping to bring the time waveform of the radio signal close to the waveform of the single carrier system. This makes it possible to reduce the PAPR to a level close to the single carrier system, relaxing the low distortion characteristic required for the radio signal circuit. This is the second characteristic.

For these two characteristics, this system is called the single carrier-frequency division multiple access (SC-FDMA).

Yet further, the SC-FDMA system has a characteristic in which, by switching mapping of the subcarrier, the frequency of the subcarrier to be used can be easily changed. With this characteristic, the LTE system enables a frequency hopping function.

FIG. 5 schematically illustrates, as an example, a case where the subcarrier mapping circuit 503 assigns the output from the DFT 303 to subcarriers (from frequency $f_5$ to frequency $f_{n-4}$) without changing a relative arrangement of frequencies, and outputs zero for subcarriers not used (from frequency $f_0$ to frequency $f_4$ and from frequency $f_{n-3}$ to $f_{n-1}$), in other words, a case where no subcarriers (from frequency $f_0$ to frequency $f_4$ and from frequency $f_{n-3}$ to $f_{n-1}$) exists, where $f_0 < f_1 < f_2 < f_3 < f_4 < f_5 < \ldots < f_{n-4} < f_{n-3} < f_{n-2} < f_{n-1}$.

The output from the subcarrier mapping circuit 503 is inputted into the inverse fast Fourier transform converter (IFFT) 404, and is converted into parallel time waveform data through applying inverse fast Fourier transform.

Configurations and operations thereafter are the same as those in FIG. 4, and thus, explanations thereof will not be repeated.

Next, a method of generating SC-FDMA signals will be described using 3GPP LTE system as an example.

Figure 6:
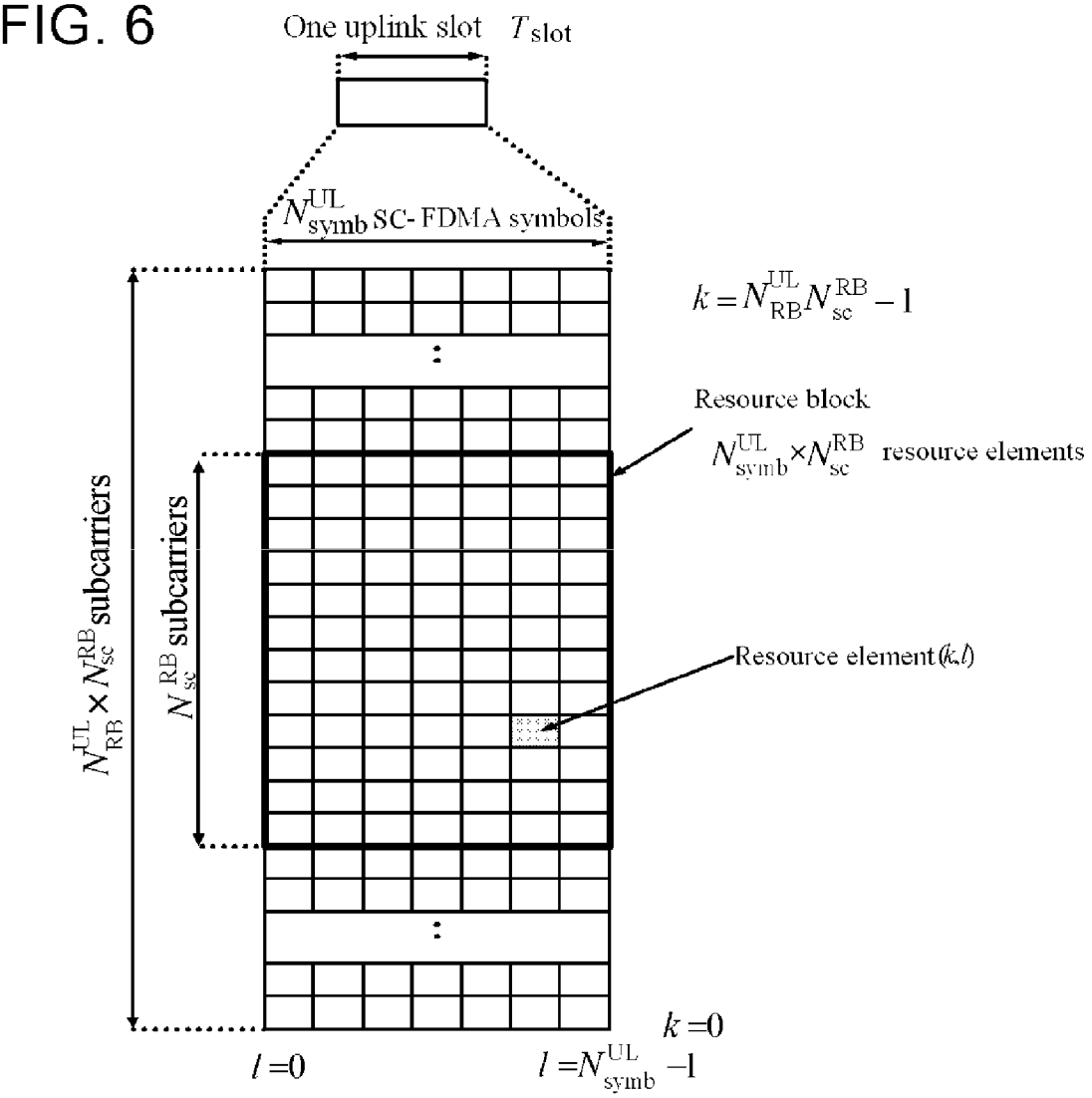
FIG. 6 is a diagram illustrating a resource grid showing arrangement of multi-value symbols on a plane of subcarrier frequency and time.

Expression (1) is one of definitions concerning the SC-FDMA system specified in a 3GPP TS36.211 standard. This Expression (1) shows an analog base band signal generated on the basis of the frequency spectrum data of subcarriers. FIG. 6 is a resource grid illustrating arrangement of frequency spectrum data on a plane of subcarrier frequency and time.

[Expression 1]

$$S_l(t) = \sum_{k=-\lfloor N_{RB}^{UL} N_{SC}^{RB}/2 \rfloor}^{\lceil N_{RB}^{UL} N_{SC}^{RB}/2 \rceil - 1} a_{k,l}^{(-)} \cdot e^{j2\pi(k+1/2)\Delta f \cdot (t - N_{CP,l} T_S)} \quad (1)$$

With comparison with FIG. 5, $S_l(t)$ on the left side represents, in a complex form, a combination (analog base band signal) of the I-ABB signal outputted from the D/A converter 109 and the Q-ABB signal outputted from the D/A converter 110, whereas $a_{k(-), 1}$ on the right side corresponds to the frequency spectrum data outputted from the subcarrier mapping circuit 503.

Most of this calculation is for inverse fast Fourier transform in the IFFT 404. The amount of calculation of inverse fast Fourier transform is known to be generally in proportion to N·log N, where N is the number of data inputted as in fast Fourier transform (the number of the waveform sampling points in the case of fast Fourier transform, and the number of the frequency point in the case of inverse fast Fourier transform). In the SC-FDMA signal in the LTE system, N is set to 2048, and hence, N·log N=15615.219 . . . can be obtained.

Next, with reference to FIG. 3, a description will be made of a transmission device 300 employing the SC-FDMA system according to the second exemplary embodiment of the present invention. The transmission device 300 employs a modulator according to the present invention.

Figure 3:
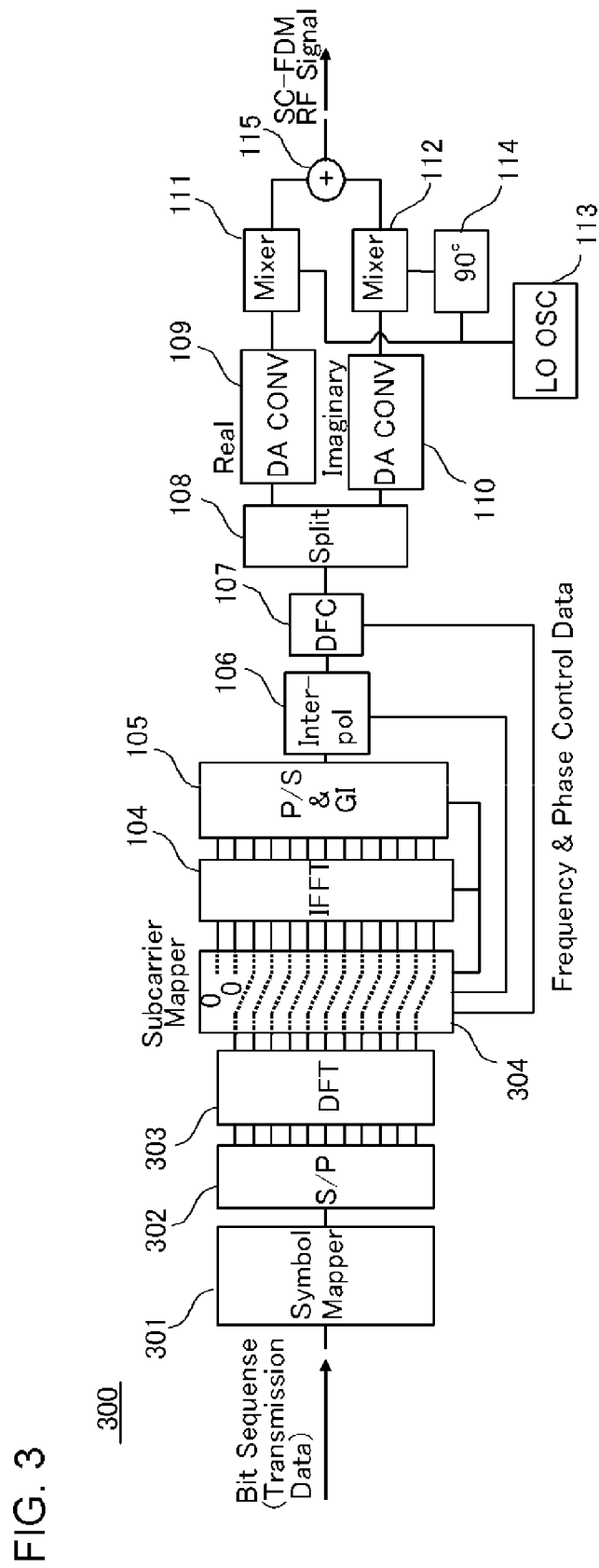
FIG. 3 is a configuration view illustrating a transmission device employing an SC-FDMA system according to a second exemplary embodiment.

In FIG. 3, a serial-parallel (S/P) converting circuit 302 acquires multi-value symbol data, which is outputted from a symbol mapping circuit 301 and is a sequence of complex numbers, and outputs parallel multi-value symbol data.

The discrete Fourier transform converter (DFT) 303 acquires the parallel multi-value symbol data, and outputs frequency spectrum data in a discrete form.

A subcarrier mapping circuit 304 acquires the frequency spectrum data, outputs to the IFFT 104, and outputs frequency point number changing signal, frequency and phase control data, and interpolation control data.

Other configurations are equivalent to those in the transmission device 100 illustrated in FIG. 1.

Next, operations of the transmission device 300 illustrated in FIG. 3 will be described.

The multi-value symbol data of sequence generated in the symbol mapping circuit 301, is inputted into the S/P converting circuit 302. The S/P converting circuit 302 applies parallel conversion to the inputted multi-value symbol data, and outputs the converted data as the parallel multi-value symbol data.

The parallel multi-value symbol data is inputted into the DFT 303. The DFT 303 applies discrete Fourier transform to the inputted data, and outputs the transformed data as discrete frequency spectrum data, which is a complex number.

The SC-FDMA system uses amplitude information and phase information contained in individual frequency spectrum data, to generate a corresponding subcarrier through inverse fast Fourier transform. The individual frequency spectrum data is linked to frequency information on the subcarrier in a subcarrier mapping circuit 304.

The subcarrier mapping circuit 304 receives the frequency spectrum data, changes the assignment of the subcarrier frequencies on the basis of values of frequency spectrum data and frequency information on subcarriers specified by the higher-order layer of the system for assigning each of the frequency spectrum data, and outputs subcarrier frequency assignment changed frequency spectrum data to the IFFT 104. Note that the term "higher-order layer of the system" is a portion of the communication system including the transmission device 300, this portion being not illustrated in FIG. 3. The higher-order layer of the system may exist in the transmission device 300, or may exist externally to the transmission device 300.

The subcarrier mapping circuit 304 generates a frequency point number changing signal, and outputs the generated signal to the IFFT 104 and the P/S converting and GI adding circuit 105. The subcarrier mapping circuit 304 generates an interpolation control signal, and outputs the generated signal to the interpolating circuit 106. Further, the subcarrier mapping circuit 304 generates a frequency and phase control signal, and outputs the generate signal to the digital frequency converter 107.

Of most of the systems employing the OFDM modulation, the SC-FDMA system in particular has a characteristic in which subcarriers are arranged locally on frequency axes. Information on assignment of subcarrier frequency, which includes information on subcarrier localization, is given from the higher-order layer of the system. On the basis of this information, the subcarrier mapping circuit 304 assigns subcarrier frequencies, and generates the frequency point number changing signal, the interpolation control signal, and the frequency and phase control signal.

Next, with reference to expressions, operations will be described using, as an example, the SC-FDMA system specified in the 3GPP TS36.211 standard, which has been already described. As described above, the 3GPP TS36.211 standard specifies Expression (1), where the SC-FDMA symbol $S_l(t)$ is the uplink (upstream) analog base band signal in the SC-FDMA system. The Expression (1) will be given below again.

[Expression 2]

$$S_l(t) = \sum_{k=-\lfloor N_{RB}^{UL} N_{SC}^{RB}/2 \rfloor}^{\lceil N_{RB}^{UL} N_{SC}^{RB}/2 \rceil - 1} a_{k,l}^{(-)} \cdot e^{j2\pi(k+1/2)\Delta f \cdot (t - N_{CP,l} T_S)} \quad (1)$$

In the Expression (1), Expression (2) represents the maximum number of subcarriers that may exist within the uplink band.

[Expression 3]

$$N_{RB}^{UL} N_{SC}^{RB} \quad (2)$$

Further, $k^{(-)}$ in Expression (1) can be defined by Expression (3).

[Expression 4]

$$k^{(-)} = k + \lfloor N_{RB}^{UL} N_{SC}^{RB}/2 \rfloor = 0, 1, \ldots, N_{RB}^{UL} N_{SC}^{RB} - 1 \quad (3)$$

Further, l represents a serial number given for identifying the SC-FDMA symbols in the time axis direction.

k represents a serial number given for identifying frequency of a subcarrier that can exist within the uplink band. Note that attention should be paid to the fact that subcarriers not assigned to this OFDM modulator in the SC-FDMA system (for example, subcarriers in the same uplink band, but used by the other transmission device) may be also included.

$a_{k,l}$ represents content of resource elements (k, l) (in other words, frequency spectrum data). Resource elements concerning subcarriers not assigned to this OFDM modulator in the SC-FDMA system may be also included, and values of content of those resource element are 0.

$\Delta f$ represents a frequency interval of the subcarrier, and is fixed to 15 kHz.

$(k+1/2)\Delta f$ represents an offset frequency from the center of the band relating to the $k^{th}$ subcarrier.

$N_{CP,l}$ represents a length of cyclic prefix expressed on a basic time unit basis.

$T_s$ represents a length of time of a basic time unit, and is 1/(30.72 MHz).

$N_{CP,l} T_s$ represents a length of time of cyclic prefix attached on the top in the $l^{th}$ SC-FDMA symbol.

Further, FIG. 6 illustrates a resource grid showing arrangement of frequency spectrum data on a plane of subcarrier frequency and time.

For convenience of explanation, the number of subcarriers assigned to the OFDM modulator of the SC-FDMA system is given by N. These subcarriers are applied to consecutively adjacent subcarriers, and thus, are applied to the $(k_s, \ldots, k_s+N-1)^{th}$ subcarrier in the analog base band signal in the SC-FDMA system. Thus, $a_{k(-),l}$ is defined by Expression (4) using $z(k-k_s)$.

[Expression 5]

$$a_{k(-),l} \equiv \begin{cases} 0 & : -\lfloor N_{RB}^{UL} N_{SC}^{RB}/2 \rfloor \leq k \leq k_s - 1 \\ z(k - k_s) & : k_s \leq k \leq k_s + N - 1 \\ 0 & : k_s + N \leq k \leq \lceil N_{RB}^{UL} N_{SC}^{RB}/2 \rceil - 1 \end{cases} \quad (4)$$

Because attention is paid to a specific SC-FDMA symbol, the letter l may be omitted from the expression. Further, for the purpose of simplification, the cyclic prefix is omitted, and by substituting Expression (4), Expression (1) can be expressed by Expression (5), where $m = k - k_s$.

[Expression 6]

$$S(t) = \sum_{k=k_s}^{k_s+N-1} z(k - k_s) \cdot e^{j2\pi(k+1/2)\Delta f \cdot t} \quad (5)$$

$$= \sum_{m=0}^{N-1} z(m) \cdot e^{j2\pi(m+k_s+1/2)\Delta f \cdot t}$$

Next, discrete inverse Fourier transform is introduced as inverse Fourier transform. Expression (5) represents an analog base band signal concerning a given SC-FDMA symbol. Replacement of inverse Fourier transform with discrete inverse Fourier transform corresponds to replacement of the analog base band signal with a digital base band signal on Expression (5).

By using $\Delta t = 1/(N \cdot \Delta f)$ and $t = \Delta t \cdot n$ (n is integer), discrete inverse Fourier transform is applied to each 1 SC-FDMA symbol, whereby the following relationship expressed by Expression (6) can be obtained.

[Expression 7]

$$0 \leq t < 1/\Delta f$$

$$0 \leq \Delta t \cdot n < 1/\Delta f$$

$$0 \leq n < 1/(\Delta t \cdot \Delta f) = N$$

$$0 \leq n \leq N - 1 \quad (6)$$

By substituting Expression (6) into Expression (5), Expression (7) can be obtained, where $n = 0, 1, \ldots, N-1$.

[Expression 8]

$$S(\Delta t \cdot n) = \sum_{m=0}^{N-1} z(m) \cdot e^{j \cdot 2\pi (m+k_s+1/2) \cdot n/N} \quad (7)$$

$$= \sum_{m=0}^{N-1} z(m) \cdot e^{j \cdot 2\pi \cdot \frac{n}{N} \cdot m} \cdot e^{j \cdot 2\pi \frac{k_s+1/2}{N} \cdot n}$$

$$= e^{j \cdot 2\pi \frac{k_s+1/2}{N} \cdot n} \cdot \sum_{m=0}^{N-1} z(m) \cdot e^{j \cdot 2\pi \cdot \frac{n}{N} \cdot m}$$

Expression (7) indicates that, in the case of using N subcarriers disposed at $(k_s, \ldots, k_s+N-1)^{th}$ in generating the digital base band signal in the SC-FDMA system, the same results can be obtained, even by applying inverse Fourier transform to these N subcarriers to generates a waveform signal, and then multiplying the thus obtained signal by a digital LO signal, which is a digital waveform of complex number. In other words, the waveform signal generated through inverse Fourier transform can be expressed by Expression (8) below, and the digital LO signal can be expressed by Expression (9) below.

[Expression 9]

$$\sum_{m=0}^{N-1} z(m) \cdot e^{j \cdot 2\pi \cdot \frac{n}{N} \cdot m} \quad (8)$$

[Expression 10]

$$e^{j \cdot 2\pi \frac{k_s+1/2}{N} \cdot n} \quad (9)$$

In the digital frequency converter 107, the digital frequency synthesizer (Digital OSC) 202 generates the digital LO signal on the basis of the expressions described above, and the complex multiplier (Mult) 201 performs multiplication.

These are descriptions of exemplary embodiments of the present inventions with reference to the drawings. However, these are merely descriptions of examples of the present invention, and various configurations other than those described above may be employed.

For example, in the description of the second exemplary embodiment, the OFDM modulator according to the present invention is applied to the transmission device of the SC-FDMA system. However, the OFDM modulator may be applied to other type of a transmission device.

The present application claims priority based on Japanese Patent Application No. 2010-92318 filed on Apr. 13, 2010, the disclosures of which are incorporated herein by reference in their entirety.

The invention claimed is:

1. An OFDM modulator comprising:
   a first circuit that acquires a plurality of complex data each of which is assigned to a dedicated subcarrier, and generates waveform data on the basis of said acquired plurality of complex data;
   a second circuit that acquires said waveform data generated by said first circuit, and shifts frequency of said waveform data;
   a third circuit that converts an acquired bit sequence into a plurality of multi-value symbol data, and assigns said dedicated subcarrier to each of said plurality of multi-value symbol data; and
   a fourth circuit that selects a portion of said plurality of multi-value symbol data acquired from said third circuit, shifts frequency of the subcarrier assigned to said selected multi-value symbol data, and outputs said frequency shifted multi-value symbol data,
   wherein said first circuit acquires each of said multi-value symbol data outputted from said fourth circuit as the complex data, and generates the waveform data on the basis of said multi-value symbol data from said fourth circuit, and
   wherein said second circuit shifts frequency of said waveform data toward a direction opposite to the shift in said fourth circuit by the amount of the frequency shifted by said fourth circuit.

2. The OFDM modulator according to claim 1, wherein said first circuit applies inverse discrete Fourier transform to said plurality of complex data to generate said waveform data.

3. The OFDM modulator according to claim 1, wherein the second circuit generates a digital signal corresponding to the frequency to shift, and multiplies said waveform data by said digital signal to shift the frequency of said waveform data.

4. The OFDM modulator according to claim 1, wherein said fourth circuit detects a frequency band of localized subcarriers, which are assigned to multi-value symbol data having a real part and an imaginary part, at least one of which is not zero, of said acquired plurality of multi-value symbol data, and performs the frequency shift in a manner such that a center frequency of subcarriers contained in said detected frequency band is brought to zero.

5. The OFDM modulator according to claim 1, further comprising:
   a fifth circuit that converts an acquired bit sequence into a plurality of multi-value symbol data;
   a sixth circuit that extracts a plurality of frequency spectrum data from said plurality of multi-value symbol data converted by said fifth circuit through discrete Fourier transform; and
   a seventh circuit that assigns the subcarrier determined in advance to said frequency spectrum data acquired from said sixth circuit to output the subcarrier assigned frequency spectrum data, wherein
   said first circuit acquires each of said subcarrier assigned frequency spectrum data outputted from said seventh circuit as said complex data, and generates said waveform data on the basis of the acquired subcarrier assigned frequency spectrum data.

6. An OFDM transmission device including a modulator comprising:
   a first circuit that acquires a plurality of complex data each of which is assigned to a dedicated subcarrier, and generates waveform data on the basis of said acquired plurality of complex data;
   a second circuit that acquires said waveform data generated by said first circuit, and shifts frequency of said waveform data;
   a third circuit that converts an acquired bit sequence into a plurality of multi-value symbol data, and assigns said dedicated subcarrier to each of said plurality of multi-value symbol data; and
   a fourth circuit that selects a portion of said plurality of multi-value symbol data acquired from said third circuit, shifts frequency of the subcarrier assigned to said selected multi-value symbol data, and outputs said frequency shifted multi-value symbol data, wherein said first circuit acquires each of said multi-value symbol data outputted from said fourth circuit as the complex data, and generates the waveform data on the basis of said multi-value symbol data from said fourth circuit, and wherein said second circuit shifts frequency of said waveform data toward a direction opposite to the shift in said fourth circuit by the amount of the frequency shifted by said fourth circuit.

7. An OFDM modulation method comprising:
converting an acquired bit sequence into a plurality of multi-value symbol data;
assigning a dedicated subcarrier to each of said plurality of multi-value symbol data;
selecting a portion of said plurality of multi-value symbol data;
shifting a frequency of the subcarrier assigned to said selected multi-value symbol data;
outputting said frequency shifted multi-value symbol data;
acquiring a plurality of complex data, wherein each of said complex data is assigned to a dedicated subcarrier, and each of said complex data is said frequency shifted multi-value symbol data;
generating waveform data on the basis of said acquired plurality of complex data;
acquiring said generated waveform data; and
shifting frequency of said waveform data toward a direction opposite to a direction which the subcarrier assigned to said selected multi-value symbol data is shifted, the amount of the shift in the frequency of said waveform data equals the amount of the shift in the frequency of the subcarrier assigned to said selected multi-value symbol data.

8. A non-transitory computer readable storage medium that stores a program for causing a computer to perform:
a first process of converting an acquired bit sequence into a plurality of multi-value symbol data, and assigning a dedicated subcarrier to each of a plurality of multi-value symbol data;
a second process of selecting a portion of said plurality of multi-value symbol data acquired from a first circuit, shifting frequency of the subcarrier assigned to said selected multi-value symbol data, and outputting said frequency shifted multi-value symbol data;
a third process of acquiring a plurality of complex data each of which is assigned to a dedicated subcarrier, and generating waveform data on the basis of said acquired plurality of complex data; and
a fourth process of acquiring said waveform data generated in said first process, and shifting frequency of said waveform data,
wherein said third process acquires each of said multi-value symbol data outputted from said second process as the complex data, and generates the waveform data on the basis of said multi-value symbol data from said second process, and
said fourth process shifts frequency of said waveform data toward a direction opposite to the shift in said second process by the amount of the frequency shifted by said second process.

9. An OFDM modulator comprising:
a first circuit that acquires a plurality of complex data each of which is assigned to a dedicated subcarrier, and generates waveform data on the basis of said acquired plurality of complex data;
a second circuit that acquires said waveform data generated by said first circuit, and shifts frequency of said waveform data; and
a third circuit that interpolates the waveform data on the basis of information on the number of sampling points for the output waveform that are thinned out.

10. The OFDM modulator according to claim 9,
wherein said first circuit applies inverse discrete Fourier transform to said plurality of complex data to generate said waveform data.

11. The OFDM modulator according to claim 9,
wherein the second circuit generates a digital signal corresponding to the frequency to shift, and multiplies said waveform data by said digital signal to shift the frequency of said waveform data.

12. The OFDM modulator according to claim 9, further comprising:
a fourth circuit that converts an acquired bit sequence into a plurality of multi-value symbol data;
a fifth circuit that extracts a plurality of frequency spectrum data from said plurality of multi-value symbol data converted by said fourth circuit through discrete Fourier transform; and
a sixth circuit that assigns the subcarrier determined in advance to said frequency spectrum data acquired from said fifth circuit to output the subcarrier assigned frequency spectrum data,
wherein said first circuit acquires each of said subcarrier assigned frequency spectrum data outputted from said sixth circuit as said complex data, and generates said waveform data on the basis of the acquired subcarrier assigned frequency spectrum data.

13. An OFDM transmission device including a modulator comprising:
a first circuit that acquires a plurality of complex data each of which is assigned to a dedicated subcarrier, and generates waveform data on the basis of said acquired plurality of complex data;
a second circuit that acquires said waveform data generated by said first circuit, and shifts frequency of said waveform data; and
a third circuit that interpolates the waveform data on the basis of information on the number of sampling points for the output waveform that are thinned out.

14. An OFDM modulation method comprising:
acquiring a plurality of complex data each of which is assigned to a dedicated subcarrier;
generating waveform data on the basis of said acquired plurality of complex data;
acquiring said generated waveform data;
shifting frequency of said waveform data; and
interpolating the waveform data on the basis of information on the number of sampling points for the output waveform that are thinned out.

15. A non-transitory computer readable storage medium that stores a program for causing a computer to perform:
a first process of acquiring a plurality of complex data each of which is assigned to a dedicated subcarrier, and generating waveform data on the basis of said acquired plurality of complex data;
a second process of acquiring said waveform data generated in said first process, and shifting frequency of said waveform data; and
a third process of interpolating the waveform data on the basis of information on the number of sampling points for the output waveform that are thinned out.

* * * * *